(12) United States Patent
Rodrigo

(10) Patent No.: US 12,069,126 B2
(45) Date of Patent: Aug. 20, 2024

(54) SERVICE REQUEST HANDLING

(71) Applicant: Telefonaktiebolaget LM Ericsson (publ), Stockholm (SE)

(72) Inventor: Maria Cruz Bartolome Rodrigo, Torremocha de Jarama Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/926,021

(22) PCT Filed: May 19, 2021

(86) PCT No.: PCT/EP2021/063344
§ 371 (c)(1),
(2) Date: Nov. 17, 2022

(87) PCT Pub. No.: WO2021/234028
PCT Pub. Date: Nov. 25, 2021

(65) Prior Publication Data
US 2023/0179653 A1  Jun. 8, 2023

(30) Foreign Application Priority Data
May 20, 2020 (EP) .................................... 20382427

(51) Int. Cl.
*G06F 15/173* (2006.01)
*H04L 67/1038* (2022.01)
(Continued)

(52) U.S. Cl.
CPC ........ *H04L 67/1038* (2013.01); *H04L 67/561* (2022.05); *H04L 67/63* (2022.05); *H04L 69/40* (2013.01)

(58) Field of Classification Search
CPC ... H04L 67/1038; H04L 67/561; H04L 67/63; H04L 69/40
See application file for complete search history.

(56) References Cited

U.S. PATENT DOCUMENTS

| 10,772,062 B1 * | 9/2020 | Albasheir ........... H04L 67/1034 |
| 2022/0191028 A1 * | 6/2022 | Aggarwal ........... H04L 63/0807 |

(Continued)

FOREIGN PATENT DOCUMENTS

| CN | 113452669 A * | 9/2021 | ......... H04L 41/0645 |
| CN | 114760630 A * | 7/2022 | |

(Continued)

OTHER PUBLICATIONS

International Search Report and Written Opinion of the International Searching Authority for PCT International Application No. PCT/EP2021/063344 dated Jul. 26, 2021.

(Continued)

*Primary Examiner* — Richard G Keehn
(74) *Attorney, Agent, or Firm* — Sage Patent Group

(57) ABSTRACT

There is provided a method for handling a service request. The method is performed by a first service communication proxy (SCP) node. If no response is received from a second network function (NF) node of a service producer to a first request transmitted towards the second NF node via the first SCP node, where the first request is for the second NF node to execute a service requested by a first NF node of a service consumer, transmission of information is initiated towards the first NF node. The information is indicative that no response is received from the second NF node to the first request.

27 Claims, 10 Drawing Sheets

(51) Int. Cl.
  *H04L 67/561* (2022.01)
  *H04L 67/63* (2022.01)
  *H04L 69/40* (2022.01)

(56) References Cited

U.S. PATENT DOCUMENTS

| | | | |
|---|---|---|---|
| 2022/0322053 A1* | 10/2022 | Das | H04L 41/0893 |
| 2023/0262459 A1* | 8/2023 | Li | H04L 67/12 |
| | | | 455/410 |
| 2023/0291818 A1* | 9/2023 | Yang | H04L 69/40 |
| | | | 709/223 |

FOREIGN PATENT DOCUMENTS

| | | | | |
|---|---|---|---|---|
| CN | 113647062 B | * | 4/2023 | ......... H04L 12/2858 |
| WO | WO-2021150153 A1 | * | 7/2021 | ............ H04W 12/08 |

OTHER PUBLICATIONS

3GPP TS 23.501 V16.4.0, "3rd Generation Partnership Project; Technical Specification Group Services and System Aspects; System architecture for the 5G System (5GS); Stage 2 (Release 16)," Mar. 2020, 430 pages.

3GPP TS 29.500 V16.3.0, "3rd Generation Partnership Project; Technical Specification Group Core Network and Terminals; 5G System; Technical Realization of Service Based Architecture; Stage 3 (Release 16)," Mar. 2020, 65 pages.

Huawei, "HTTP status code used by SCP/SEPP," C4-211409, 3GPP TSG-CT WG4 Meeting #102-e, E-Meeting, Feb. 24-Mar. 5, 2021, 8 pages.

3GPP TS 23.502 V16.4.0, "3rd Generation Partnership Project; Technical Specification Group Services and System Aspects; Procedures for the 5G System (5GS); Stage 2 (Release 16)," Mar. 2020, 582 pages.

* cited by examiner

Initiate transmission of a second request towards a second NF node via a second SCP node for the second NF node to execute a service for a first NF node — 202

SERVICE REQUEST HANDLING

CROSS REFERENCE TO RELATED APPLICATIONS

This application is a 35 U.S.C. § 371 national stage application of PCT International Application No. PCT/EP2021/063344 filed on May 19, 2021, which claims the benefit of European Patent Application No. 20382427.1, filed on May 20, 2020, the disclosures and content of which are incorporated by reference herein in their entireties.

TECHNICAL FIELD

The disclosure relates to methods for handling a service request in a network and nodes configured to operate in accordance with those methods.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer and the NF node of the service producer can communicate directly or indirectly. This is referred to as direct communication and indirect communication respectively. In the case of indirect communication, the NF node of the service consumer and the NF node of the service producer may communicate via a service communication proxy (SCP) node.

FIG. 1A-D illustrates different existing systems for handling service requests, as set out in 3GPP TS 23.501 v16.4.0. In more detail, FIGS. 1A and 1B illustrates a system that uses direct communication, while FIGS. 1C and 1D illustrates a system that uses indirect communication.

In the systems illustrated in FIGS. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF). Thus, in the system illustrated in FIG. 1B, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In the system illustrated in FIG. 1A, the NRF is not used and instead the NF node of the consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP. Similarly, any subsequent service requests are sent indirectly from the NF node of the service consumer to the NF node of the service producer via the SCP. The systems illustrated in FIGS. 1C and D also comprise an NRF.

In the system illustrated in FIG. 1C, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In this case, the service request sent from the NF node of the service consumer to the SCP comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP may communicate with the NRF to acquire selection parameters (e.g. location, capacity, etc.) and the SCP may select an NF node of the service producer to which to send the service request.

In the system illustrated in FIG. 1D, the NF node of the consumer does not carry out the discovery or selection process. Instead, the NF node of the consumer adds any necessary discovery and selection parameters (required to find a suitable NF node of the service producer) to the service request that it sends via the SCP. The SCP uses the request address and the discovery and selection parameters in the service request to route the service request to a suitable NF node of the service producer. The SCP can perform discovery with the NRF.

For the fifth generation core (5GC), from Release 16, the SCP is included as a network element to allow indirect communication between an NF node of a service consumer and an NF node of a service producer. The indirect communication that is used can be either of the two indirect communications options described earlier with reference to FIGS. 1C and 1D.

FIG. 2A-C is a signalling diagram illustrating an exchange of signals in an existing system, such as the system illustrated in FIG. 1C but it will be understood the issue described can also apply to the system illustrated in FIG. 1D. The system illustrated in FIG. 2A-C comprises a first SCP node 10, a first NF node 20 of a service consumer ("NFc"), a second NF node 30 of a service producer ("NFp1"), and a third NF node 70 of a service producer ("NFp2"). The first SCP node 10 is configured to operate as an SCP between the first NF node 20 and the second NF node 30. The second NF node 30 can be configured to run a service 40 and the third NF node 70 can be configured to run a service 80. The second NF node 30 and the third NF node 70 can be configured to run the same service or a different service. The second NF node 30 and the third NF node 70 can be part of a set 402 of NF nodes of a service producer. The system illustrated in FIG. 2A-C also comprises a network repository function 60.

In FIG. 2A-C, steps 600-624 relate to a first request for a user equipment (UE)/session context. As illustrated by block 500 of FIG. 2A-C, the UE/session context may be stored. In more detail, as illustrated by block 600 of FIG. 2A-C, the first NF node 20 determines what discovery and selection parameters to use. The parameters can be associated with a certain service in a received request, which is not illustrated in FIG. 2A-C. As illustrated by blocks 502 and 602 of FIG. 2A-C, the first NF node 20 stores the UE/session context for the request received. This storage may be cached or externally stored.

As illustrated by arrow 604 of FIG. 2A-C, the first NF node 20 initiates transmission of a discovery request to the NRF 60 to obtain NF profile(s) of one or more NF nodes of the service producer for the service that needs to be executed. As illustrated by arrow 606 of FIG. 2A-C, the first NF node 20 receives a response from the NRF 60 comprising the NF profile(s) of one or more NF nodes of the service producer. As illustrated by blocks 504 and 608 of FIG. 2A-C, the first NF node 20 can store the discovered NF profile(s) in the corresponding UE/session context. As illustrated by block 610 of FIG. 2A-C, the first NF node 20 selects one NF node of the service producer from the one(s) discovered using, for example, functional criteria (e.g. subscription permanent identifier (SUPI), network slice selection assistance information (NSSAI), data network name (DNN), etc.) or non-functional criteria (e.g. load, capacity, etc.). For the purpose of the illustration, it is assumed that the first NF node 20 selects the second NF node 30.

As illustrated by arrow 612 of FIG. 2A-C, the first NF node 20 initiates transmission of a service request towards the first SCP node 10. The first NF node 20 may know via which SCP to route the service request by configuration or other means. The service request can comprise information identifying the selected second NF node 30, such as a hypertext transfer protocol (HTTP) header that identifies the selected second NF node 30 (the target application programming interface (API) root). As illustrated by block 614 of FIG. 2A-C, the first SCP node 10 replaces its own address in the host part of the uniform resource identifier (URI) by the one included in service request (the target API root). As illustrated by block 616 of FIG. 2A-C, the first SCP node 10 may perform any extra functionality, such as monitoring/tracing.

As illustrated by arrow 618 of FIG. 2A-C, the first SCP node 10 initiates transmission of the service request towards the selected second NF node 30. As illustrated by arrow 620 of FIG. 2A-C, the first SCP node 10 receives a response comprising the result. The result may comprise some business logic (BL) information, e.g. as a result of the service execution. As illustrated by arrow 622 of FIG. 2A-C, the first SCP node 10 initiates transmission of the response comprising the result towards the first NF node 20. As illustrated by blocks 506 and 624 of FIG. 2A-C, the first NF node 20 can store the result.

In FIG. 2A-C, steps 626-628 relate to subsequent service requests for an existing UE/Session context. As illustrated by block 626 of FIG. 2A-C, another request (not illustrated) to execute a service is received by the first NF node 20 and this service request is identified to correspond to the same UE/session context in respect of which the earlier request was received. As illustrated by block 628 of FIG. 2A-C, the process is repeated from block 610 onwards. In FIG. 2A-C, steps 630-662 relate to subsequent service requests for an existing UE/Session context where reselection is required, where step 630 is the same as step 626 and steps 632-640 are the same as steps 610-618. However, as illustrated by arrow 642 of FIG. 2A-C, there is a lack of response from the second NF node 30.

As illustrated by arrow 644 of FIG. 2A-C, if no response is received by the first SCP node 10, the first SCP node 10 initiates transmission of a response to the first NF node 20. The response comprises information (e.g. an existing HTTP error, such as a 504 error) indicative that there is an error situation. As illustrated by block 646 of FIG. 2A-C, the first NF node 20 needs to interpret what to do based on the error received. As illustrated by block 648 of FIG. 2A-C, based on a 504 error, a normal behaviour is for the first NF node 20 to perform a reselection. That is, the first NF node 20 selects another NF node of the service producer, since it seems that the second NF node 30 is not reachable. For the purpose of the illustration, it is assumed that the first NF node 20 selects the third NF node 70. In FIG. 2A-C, steps 650-656 are the same as steps 612-618 but in relation to the third NF node 70.

As illustrated by arrow 658 of FIG. 2A-C, there is also a lack of response from the third NF node 70. This may be the case where there is a connectivity error either in general or in the connection towards the specific NF node. As illustrated by arrow 660 of FIG. 2A-C, if no response is received by the first SCP node 10, the first SCP node 10 initiates transmission of a response to the first NF node 20. The response comprises information (e.g. an existing HTTP error, such as a 504 error) indicative that there is an error situation. As illustrated by block 662 of FIG. 2A-C, if alternative NF nodes of the service producer are available, another selection may be performed (that, is steps 646 onwards may be repeated) with a similar unsuccessful result. As also illustrated by block 662 of FIG. 2A-C, if there are no more alternative NF nodes of the service producer available, the service request is rejected.

Thus, even though NF nodes (e.g. the second NF node 30 and/or third NF node 70) of the service producer may be available and operational (e.g. up and running), the procedure can still fail. For example, all request via the same SCP node will fail if the SCP node has connectivity issues, which can be a large amount of requests, perhaps even all the requests from the first NF node 20. A redundant SCP deployment will be common in most cases.

SUMMARY

It is an object of the disclosure to obviate or eliminate at least some of the above-described disadvantages associated with existing techniques.

Therefore, according to an aspect of the disclosure, there is provided a method for handling a service request in a network. The method is performed by a first service communication proxy (SCP) node that is configured to operate as an SCP between a first network function (NF) node of a service consumer and a second NF node of a service producer in the network. The method comprises initiating transmission of information towards the first NF node if no response is received from the second NF node to a first request transmitted towards the second NF node via the first SCP node. The first request is for the second NF node to execute a service requested by the first NF node. The information is indicative that no response is received from the second NF node to the first request.

In some embodiments, the information may be a newly created hypertext transfer protocol (HTTP) status code or the information is accompanied by an existing HTTP status code.

In some embodiments, the information may be indicative of whether the second NF node is operative.

In some embodiments, the information may be indicative of whether the first SCP node failed to connect to the second NF node.

In some embodiments, the first SCP node and the first NF node (20) may be deployed in independent deployment units, and/or the first SCP node and the second NF node may be deployed in independent deployment units.

In some embodiments, the first SCP node may be deployed as a distributed network element.

In some embodiments, part of the first SCP node may be deployed in the same deployment unit as the first NF node and/or part of the first SCP node may be deployed in the same deployment unit as the second NF node.

In some embodiments, at least one third SCP node may be configured to operate as an SCP between the first NF node and the first SCP node, and/or at least one fourth SCP node may be configured to operate as an SCP between the first SCP node and the second NF node.

In some embodiments, the first SCP node and one or both of the at least one third SCP node and the at least one fourth SCP node may be deployed in independent deployment units.

In some embodiments, the at least one third SCP node and/or the at least one fourth SCP node may be deployed as distributed network elements.

In some embodiments, an entity may comprise the first SCP node and a network repository function (NRF).

According to another aspect of the disclosure, there is provided a first SCP node comprising processing circuitry configured to operate in accordance with the method described earlier in respect of the first SPC node. In some embodiments, the first SCP node may comprise at least one memory for storing instructions which, when executed by the processing circuitry, cause the first SCP node to operate in accordance with the method described earlier in respect of the first SPC node.

According to another aspect of the disclosure, there is provided a method for handling a service request in a network. The method is performed by a first network function, (NF) node of a service consumer. A first service communication proxy (SCP) node is configured to operate as an SCP between the first NF node and a second NF node of a service producer in the network. The method comprises initiating transmission of a second request towards the second NF node via a second SCP node in response to receiving information indicative that no response is received from the second NF node to a first request transmitted towards the second NF node via the first SCP node. The first request is for the second NF node to execute a service for the first NF node. The second request is for the second NF node to execute the service for the first NF node. The second SCP node is configured to operate as an SCP between the first NF node and the second NF node in the network. The second SCP node is a different SCP node to the first SCP node.

In some embodiments, the method may comprise selecting the second SCP node.

In some embodiments, the second SCP node may be an SCP node that is in the same SCP domain as the first SCP node.

In some embodiments, the information may be a newly created hypertext transfer protocol (HTTP) status code or the information is accompanied by an existing HTTP status code.

In some embodiments, transmission of the second request towards the second NF node via the second SCP node may be initiated if the second NF node is operative.

In some embodiments, the information may be indicative of whether the second NF node is operative.

In some embodiments, the method may comprise checking whether the second NF node is operative.

In some embodiments, checking whether the second NF node is operative may comprise checking a status of the second NF node to identify whether the second NF node is operative.

In some embodiments, the status may be checked with the second NF node or a network repository function (NRF).

In some embodiments, checking the status with the second NF node may comprise initiating transmission of a third request towards the second NF node, wherein the third request may be a request for the status of the second NF node.

In some embodiments, if a response to the third request is received from the second NF node, the second NF node may be operative. In some embodiments, if no response to the third request is received from the second NF node, the second NF node may be inoperative.

In some embodiments, the third request may be a hypertext transfer protocol (HTTP) request.

In some embodiments, the third request may be a HTTP ping request or a HTTP head request.

In some embodiments, transmission of the second request towards the second NF node via the second SCP node may be initiated if no response to the first request is received from the second NF node due to the first SCP node failing to connect to the second NF node.

In some embodiments, the information may be indicative of whether the first SCP node failed to connect to the second NF node.

In some embodiments, the method may comprise checking whether the first SCP node failed to connect to the second NF node.

In some embodiments, the first SCP node failing to connect to the second NF node may be the first SCP node itself failing to connect to the second NF node or at least one fourth SCP node failing to connect to the second NF node, wherein the at least one fourth SCP node may be configured to operate as an SCP between the first SCP node and the second NF node.

In some embodiments, checking whether the at least one fourth SCP node failed to connect to the second NF node may comprise checking a status of the at least one fourth SCP node to identify whether the at least one fourth SCP node failed to connect to the second NF node.

In some embodiments, the status may be checked with the at least one fourth SCP node or a network repository function (NRF).

In some embodiments, checking the status with the at least one fourth SCP node may comprise initiating transmission of a fourth request towards the at least one fourth SCP node, wherein the fourth request may be a request for the status of the at least one fourth SCP node.

In some embodiments, if no response to the fourth request is received from at least one fourth SCP node, the at least one fourth SCP node may have failed to connect to the second NF node. In some embodiments, if a response to the fourth request is received from the at least one fourth SCP node, the at least one fourth SCP node may have succeeded to connect to the second NF node.

In some embodiments, the fourth request may be a hypertext transfer protocol (HTTP) request.

In some embodiments, the fourth request may be a HTTP ping request or a HTTP head request.

In some embodiments, the first SCP node and the first NF node may be deployed in independent deployment units, and/or the first SCP node and the second NF node may be deployed in independent deployment units.

In some embodiments, the first SCP node may be deployed as a distributed network element.

In some embodiments, part of the first SCP node may be deployed in the same deployment unit as the first NF node, and/or part of the first SCP node may be deployed in the same deployment unit as the second NF node.

In some embodiments, at least one third SCP node may be configured to operate as an SCP between the first NF node and the first SCP node, wherein the at least one third SCP node may be a different SCP node to the second SCP node, and/or at least one fourth SCP node may be configured to operate as an SCP between the first SCP node and the second NF node, wherein the at least one fourth SCP node may be a different SCP node to the second SCP node.

In some embodiments, the first SCP node and one or both of the at least one third SCP node and the at least one fourth SCP node may be deployed in independent deployment units.

In some embodiments, the at least one third SCP node and/or the at least one fourth SCP node may be deployed as distributed network elements.

In some embodiments, an entity may comprise the first SCP node and a network repository function (NRF).

According to another aspect of the disclosure, there is provided a first NF node comprising processing circuitry configured to operate in accordance with the method described earlier in respect of the first NF node. In some embodiments, the first NF node may comprise at least one memory for storing instructions which, when executed by the processing circuitry, cause the first NF node to operate in accordance with the method described earlier in respect of the first NF node.

According to another aspect of the disclosure, there is provided a method performed by a system. The method may comprise the method described earlier in respect of the first SCP node and/or the method as described earlier in respect of the first NF node.

According to another aspect of the disclosure, there is provided a system. The system may comprise at least one first SCP node as described earlier and/or at least one first NF node as described earlier.

According to another aspect of the disclosure, there is provided a computer program comprising instructions which, when executed by processing circuitry, cause the processing circuitry to perform the method as described earlier in respect of the first SCP node and/or first NF node.

According to another aspect of the disclosure, there is provided a computer program product, embodied on a non-transitory machine-readable medium, comprising instructions which are executable by processing circuitry to cause the processing circuitry to perform the method as described earlier in respect of the first SCP node and/or first NF node.

Thus, an improved technique for handling service requests in a network is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

Herein, techniques for handling a service request in a network are described. A service request can also be referred to as a request for a service. Generally, a service is software intended to be managed for users. Herein, a service can be any type of service, such as a communication service (e.g. a notification service or a callback service), a context management (e.g. user equipment context management (UECM)) service, a data management (DM) service, or any other type of service. The techniques described herein can be used in respect of any network, such as any communications or telecommunications network, e.g. cellular network. The network may be a fifth generation (5G) network or any other generation network. In some embodiments, the network may be a core network or a radio access network (RAN). The techniques described herein are implemented by a first service communication proxy (SCP) node and a first network function (NF) node.

An NF is a third generation partnership project (3GPP) adopted or 3GPP defined processing function in a network, which has defined functional behaviour and 3GPP defined interfaces. An NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios.

Figures 3, 4:
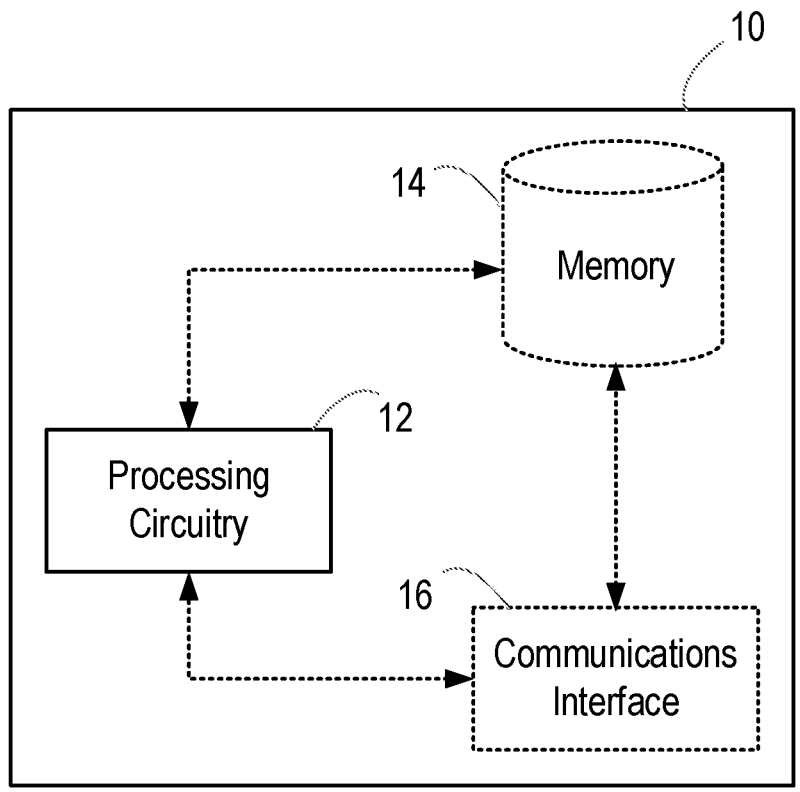
FIG. 3 is a block diagram illustrating a first service communication proxy (SCP) node according to an embodiment.
FIG. 4 is a flowchart illustrating a method performed by a first SCP node according to an embodiment.

FIG. 3 illustrates a first SCP node 10 in accordance with an embodiment. The first SCP node 10 is for handling a service request in a network. The first SCP node 10 is configured to operate as an SCP between a first network function, NF, node (20) of a service consumer and a second NF node (30) of a service producer in the network. In some embodiments, the first SCP node 10 can be, for example, be a physical machine (e.g. a server) or a virtual machine (VM).

As illustrated in FIG. 3, the first SCP node 10 comprises processing circuitry (or logic) 12. The processing circuitry 12 controls the operation of the first SCP node 10 and can implement the method described herein in respect of the first SCP node 10. The processing circuitry 12 can be configured or programmed to control the first SCP node 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first SCP node 10. In some embodiments, the processing circuitry 12 can be configured to run software to perform the method described herein in respect of the first SCP node 10. The software may be containerised according to some embodiments. Thus, in some embodiments, the processing circuitry 12 may be configured to run a container to perform the method described herein in respect of the first SCP node 10.

Briefly, the processing circuitry 12 of the first SCP node 10 is configured to, if no response is received from a second NF node of a service producer to a first request, initiate transmission of information towards a first NF node of a service consumer. The first request is transmitted towards the second NF node via the first SCP node 10 and is for the second NF node to execute (or provide) a service requested by the first NF node. The information is indicative that no response is received from the second NF node to the first request.

As illustrated in FIG. 3, in some embodiments, the first SCP node 10 may optionally comprise a memory 14. The memory 14 of the first SCP node 10 can comprise a volatile memory or a non-volatile memory. In some embodiments, the memory 14 of the first SCP node 10 may comprise a non-transitory media. Examples of the memory 14 of the first SCP node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first SCP node 10 can be connected to the memory 14 of the first SCP node 10. In some embodiments, the memory 14 of the first SCP node 10 may be for storing program code or instructions which, when executed by the processing circuitry 12 of the first SCP node 10, cause the first SCP node 10 to operate in the manner described herein in respect of the first SCP node 10. For example, in some embodiments, the memory 14 of the first SCP node 10 may be configured to store program code or instructions that can be executed by the processing circuitry 12 of the first SCP node 10 to cause the first SCP node 10 to operate in accordance with the method described herein in respect of the first SCP node 10. Alternatively or in addition, the memory 14 of the first SCP node 10 can be configured to store any information, data, messages, requests, responses, indications, notifications, signals, or similar, that are described herein. The processing circuitry 12 of the first SCP node 10 may be configured to control the memory 14 of the first SCP node 10 to store information, data, messages, requests, responses, indications, notifications, signals, or similar, that are described herein.

In some embodiments, as illustrated in FIG. 3, the first SCP node 10 may optionally comprise a communications interface 16. The communications interface 16 of the first SCP node 10 can be connected to the processing circuitry 12 of the first SCP node 10 and/or the memory 14 of first SCP node 10. The communications interface 16 of the first SCP node 10 may be operable to allow the processing circuitry 12 of the first SCP node 10 to communicate with the memory 14 of the first SCP node 10 and/or vice versa. Similarly, the communications interface 16 of the first SCP node 10 may be operable to allow the processing circuitry 12 of the first SCP node 10 to communicate with the first NF node and/or any other node. The communications interface 16 of the first SCP node 10 can be configured to transmit and/or receive information, data, messages, requests, responses, indications, notifications, signals, or similar, that are described herein. In some embodiments, the processing circuitry 12 of the first SCP node 10 may be configured to control the communications interface 16 of the first SCP node 10 to transmit and/or receive information, data, messages, requests, responses, indications, notifications, signals, or similar, that are described herein.

Although the first SCP node 10 is illustrated in FIG. 3 as comprising a single memory 14, it will be appreciated that the first SCP node 10 may comprise at least one memory (i.e. a single memory or a plurality of memories) 14 that operate in the manner described herein. Similarly, although the first SCP node 10 is illustrated in FIG. 3 as comprising a single communications interface 16, it will be appreciated that the first SCP node 10 may comprise at least one communications interface (i.e. a single communications interface or a plurality of communications interface) 16 that operate in the manner described herein. It will also be appreciated that FIG. 3 only shows the components required to illustrate an embodiment of the first SCP node 10 and, in practical implementations, the first SCP node 10 may comprise additional or alternative components to those shown.

FIG. 4 is a flowchart illustrating a method performed by a first SCP node 10 in accordance with an embodiment. The first SCP node 10 is configured to operate as an SCP between a first NF node of a service consumer and a second NF node of a service producer in the network. The method is for handling a service request in the network. The first SCP node 10 described earlier with referenced to FIG. 3 is configured to operate in accordance with the method of FIG. 4. The method can be performed by or under the control of the processing circuitry 12 of the first SCP node 10.

The method of FIG. 4 is performed if no response is received from the second NF node to a first request transmitted towards the second NF node via the first SCP node 10. The first request is for the second NF node to execute (or provide) a service requested by the first NF node. As illustrated at block 102 of FIG. 4, transmission of information is initiated towards the first NF node. The information is indicative that no response is received from the second NF node to the first request.

Herein, the term "initiate" can mean, for example, cause or establish. Thus, the processing circuitry 12 of the first SCP node 10 can be configured to itself transmit the information (e.g. via a communications interface 16 of the first SCP node 10) or can be configured to cause another node to transmit the information. In some embodiments, the first request can be a hypertext transfer protocol (HTTP) request.

Figures 5, 6:
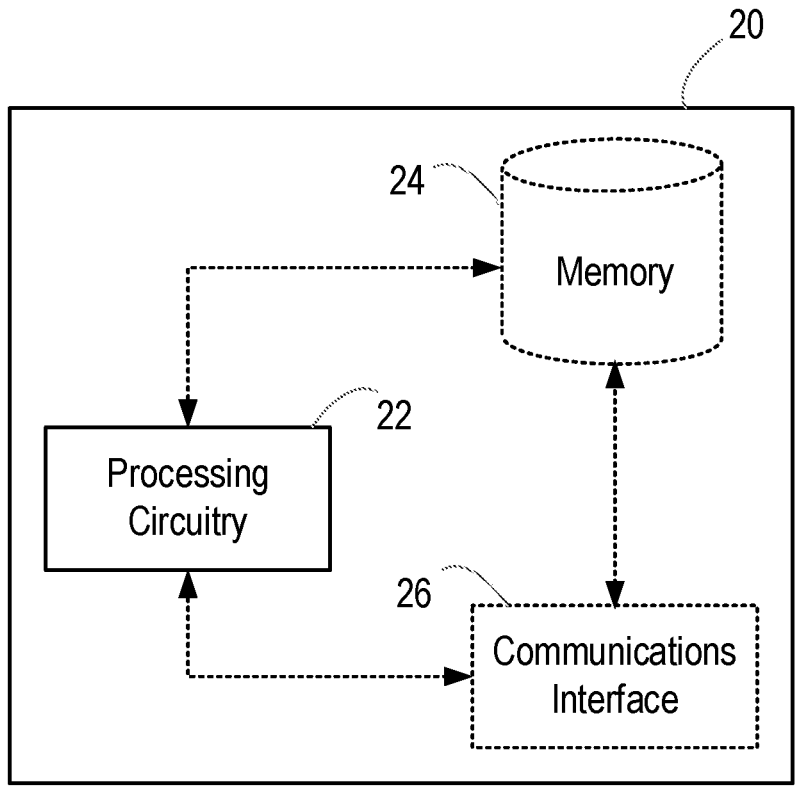
FIG. 5 is a block diagram illustrating a first network function (NF) node according to an embodiment.
FIG. 6 is a flowchart illustrating a method performed by a first NF node according to an embodiment.

FIG. 5 illustrates a first NF node 20 in accordance with an embodiment. The first NF node 20 is for handling a service request in a network. The first NF node 20 is configured to operate as an SCP between a first NF node of a service consumer and a second NF node of a service producer in the network. In some embodiments, the first NF node 20 can be, for example, be a physical machine (e.g. a server) or a virtual machine (VM). The first NF node 20 can be, for example, a user equipment (UE).

As illustrated in FIG. 5, the first NF node 20 comprises processing circuitry (or logic) 22. The processing circuitry 22 controls the operation of the first NF node 20 and can implement the method described herein in respect of the first NF node 20. The processing circuitry 22 can be configured or programmed to control the first NF node 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first NF node 20. In some embodiments, the processing circuitry 22 can be configured to run software to perform the method described herein in respect of the first NF node 20. The software may be containerised according to some embodiments. Thus, in some embodiments, the processing circuitry 22 may be configured to run a container to perform the method described herein in respect of the first NF node 20.

Briefly, the processing circuitry 22 of the first NF node 20 is configured to, in response to receiving information indicative that no response is received from the second NF node to a first request transmitted towards the second NF node via the first SCP node, initiate transmission of a second request towards the second NF node via a second SCP node. The first request is for the second NF node to execute (or provide) a service requested by the first NF node. The second request is also for the second NF node to execute (or provide) the service for the first NF node. The second SCP node is configured to operate as an SCP between the first NF node and the second NF node in the network. The second SCP node is a different SCP node to the first SCP node 10.

As illustrated in FIG. 5, in some embodiments, the first NF node 20 may optionally comprise a memory 24. The memory 24 of the first NF node 20 can comprise a volatile memory or a non-volatile memory. In some embodiments, the memory 24 of the first NF node 20 may comprise a non-transitory media. Examples of the memory 24 of the first NF node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the first NF node 20 can be connected to the memory 24 of the first NF node 20. In some embodiments, the memory 24 of the first NF node 20 may be for storing program code or instructions which, when executed by the processing circuitry 22 of the first NF node 20, cause the first NF node 20 to operate in the manner described herein in respect of the first NF node 20. For example, in some embodiments, the memory 24 of the first NF node 20 may be configured to store program code or instructions that can be executed by the processing circuitry 22 of the first NF node 20 to cause the first NF node 20 to operate in accordance with the method described herein in respect of the first NF node 20. Alternatively or in addition, the memory 24 of the first NF node 20 can be configured to store any information, data, messages, requests, responses, indications, notifications, signals, or similar, that are described herein. The processing circuitry 22 of the first NF node 20 may be configured to control the memory 24 of the first NF node 20 to store information, data, messages, requests, responses, indications, notifications, signals, or similar, that are described herein.

In some embodiments, as illustrated in FIG. 5, the first NF node 20 may optionally comprise a communications interface 26. The communications interface 26 of the first NF node 20 can be connected to the processing circuitry 22 of the first NF node 20 and/or the memory 24 of first NF node 20. The communications interface 26 of the first NF node 20 may be operable to allow the processing circuitry 22 of the first NF node 20 to communicate with the memory 24 of the first NF node 20 and/or vice versa. Similarly, the communications interface 26 of the first NF node 20 may be operable to allow the processing circuitry 22 of the first NF node 20 to communicate with the first SCP node 10 and/or any other node. The communications interface 26 of the first NF node 20 can be configured to transmit and/or receive information, data, messages, requests, responses, indications, notifications, signals, or similar, that are described herein. In some embodiments, the processing circuitry 22 of the first NF node 20 may be configured to control the communications interface 26 of the first NF node 20 to transmit and/or receive information, data, messages, requests, responses, indications, notifications, signals, or similar, that are described herein.

Although the first NF node 20 is illustrated in FIG. 5 as comprising a single memory 24, it will be appreciated that the first NF node 20 may comprise at least one memory (i.e. a single memory or a plurality of memories) 24 that operate in the manner described herein. Similarly, although the first NF node 20 is illustrated in FIG. 5 as comprising a single communications interface 26, it will be appreciated that the first NF node 20 may comprise at least one communications interface (i.e. a single communications interface or a plurality of communications interface) 26 that operate in the manner described herein. It will also be appreciated that FIG. 5 only shows the components required to illustrate an embodiment of the first NF node 20 and, in practical implementations, the first NF node 20 may comprise additional or alternative components to those shown.

FIG. 6 is a flowchart illustrating a method performed by a first NF node 20 in accordance with an embodiment. The method of FIG. 6 is for handling a service request in the network. The first NF node 20 described earlier with referenced to FIG. 5 is configured to operate in accordance with the method of FIG. 6. The method can be performed by or under the control of the processing circuitry 22 of the first NF node 20. A first SCP node 10 is configured to operate as an SCP between the first NF node 20 and a second NF node of a service producer in the network, The method of FIG. 6 is performed in response to receiving information indicative that no response is received from the second NF node to a first request. The first request is transmitted towards the second NF node via the first SCP node 10 and is for the second NF node to execute (or provide) a service for the first NF node 20. As illustrated at block 202 of FIG. 6, transmission of a second request is initiated towards the second NF node via a second SCP node for the second NF node to execute (or provide) the service for the first NF node. The second SCP node is configured to operate as an SCP between the first NF node 20 and the second NF node in the network. The second SCP node is a different SCP node to the first SCP node 10.

There is also provided a system. The system can comprise at least one first SCP node 10 as described herein and/or at least one first NF node 20 as described herein. The system may also comprise any one or more of the other nodes mentioned herein.

Figure 7A:
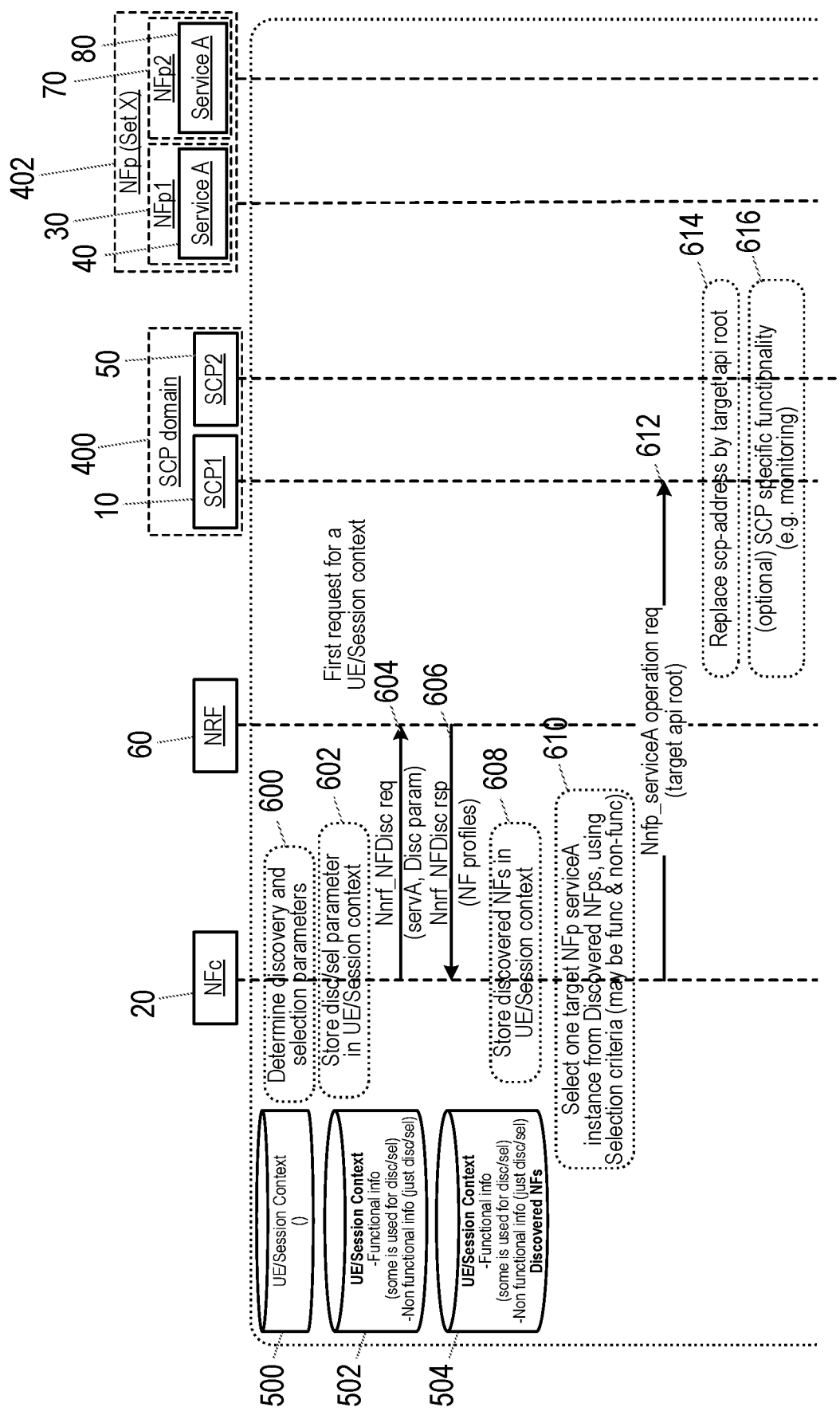
FIG. 7A-C is a signalling diagram illustrating an exchange of signals in a system according to an embodiment.
Figure 7B:
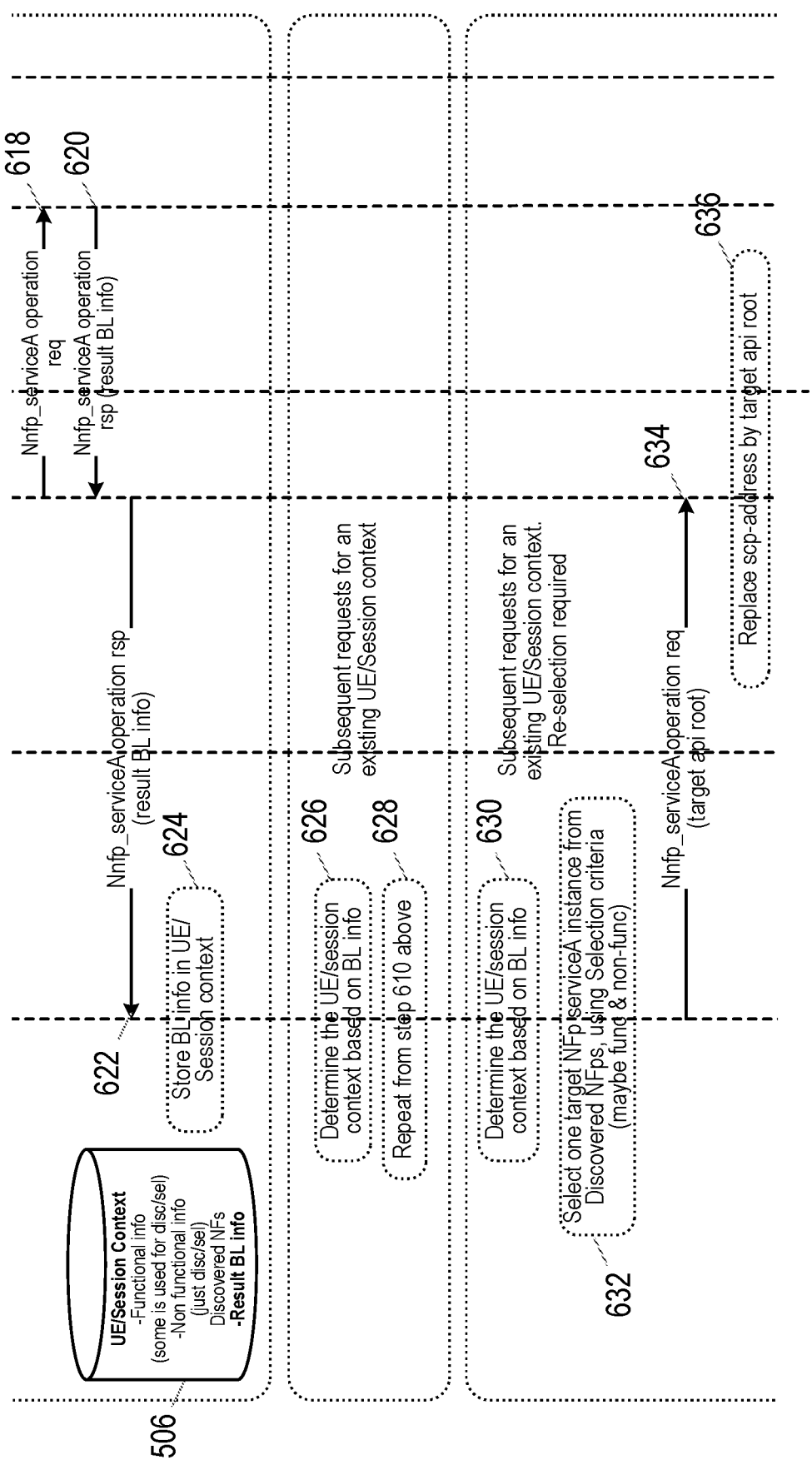
Figure 7C:
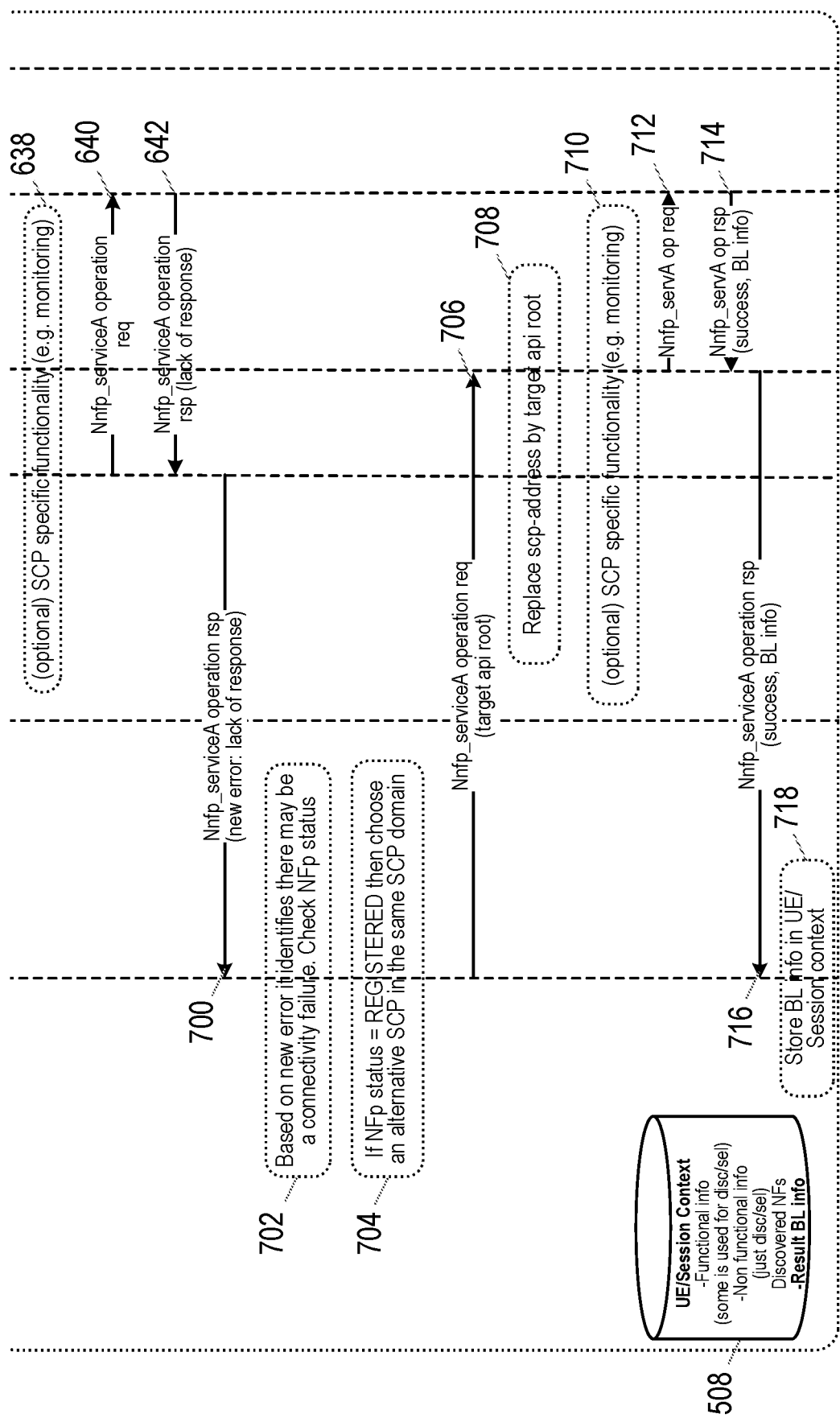

FIG. 7A-C is a signalling diagram illustrating an exchange of signals in a system according to an embodiment. The system illustrated in FIG. 7A-C comprises a first SCP node 10 and a second SCP node 50. In the system illustrated in FIG. 7A-C, the second SCP node 50 is an SCP node that is in the same SCP domain 400 as the first SCP node 10. The second SCP node 50 is a different SCP node to the first SCP node 10. The first SCP node 10 can be as described earlier with reference to FIGS. 3 and 4. The second SCP node 50 can be as described earlier with reference to FIGS. 5 and 6.

The system illustrated in FIG. 7A-C comprises a first NF node 20 of a service consumer ("NFc"), a second NF node 30 of a service producer ("NFp1"), and a third NF node 70 of a service producer ("NFp2"). The first SCP node 10 is configured to operate as an SCP between the first NF node 20 and the second NF node 30. The second SCP node 50 is configured to operate as an SCP between the first NF node 20 and the second NF node 30. The second NF node 30 can be configured to run (or provide) a service 40. The third NF node 70 can be configured to run (or provide) a service 80. The second NF node 30 and the third NF node 70 can be configured to run (or provide) the same service or a different service. The second NF node 30 and the third NF node 70 can be part of a set (or group) 402 of NF nodes of a service producer. The system illustrated in FIG. 7A-C comprises a network repository function (NRF) 60. In some embodiments, an entity may comprise the first SCP node 10 and the NRF 60. That is, in some embodiments, the first SCP node 10 can be merged with the NRF 60 in a combined entity.

In some embodiments, the first SCP node 10 and the first NF node 20 may be deployed in independent deployment units and/or the first SCP node 10 and the second NF node 30 may be deployed in independent deployment units. Thus, an SCP node based on independent deployment units is possible, as described in 3GPP TS 23.501 V16.4.0. In other embodiments, the first SCP node 10 may be deployed as a distributed network element. For example, in some embodiments, part (e.g. a service agent) of the first SCP node 10 may be deployed in the same deployment unit as the first NF node 20 and/or part (e.g. a service agent) of the first SCP node 10 may be deployed in the same deployment unit as the second NF node 30. Thus, an SCP node based on service mesh is possible, as described in 3GPP TS 23.501 V16.4.0.

In some embodiments, at least one third SCP node may be configured to operate as an SCP between the first NF node 20 and the first SCP node 10 and/or at least one fourth SCP node may be configured to operate as an SCP between the first SCP node 10 and the second NF node 30. Thus, a multipath of SCP nodes is possible. In some of these embodiments, the first SCP node 10 and one or both of the at least one third SCP node and the at least one fourth SCP node may be deployed in independent deployment units. In some embodiments, the at least one third SCP node and/or the at least one fourth SCP node may be deployed as distributed network elements.

Figure 1:
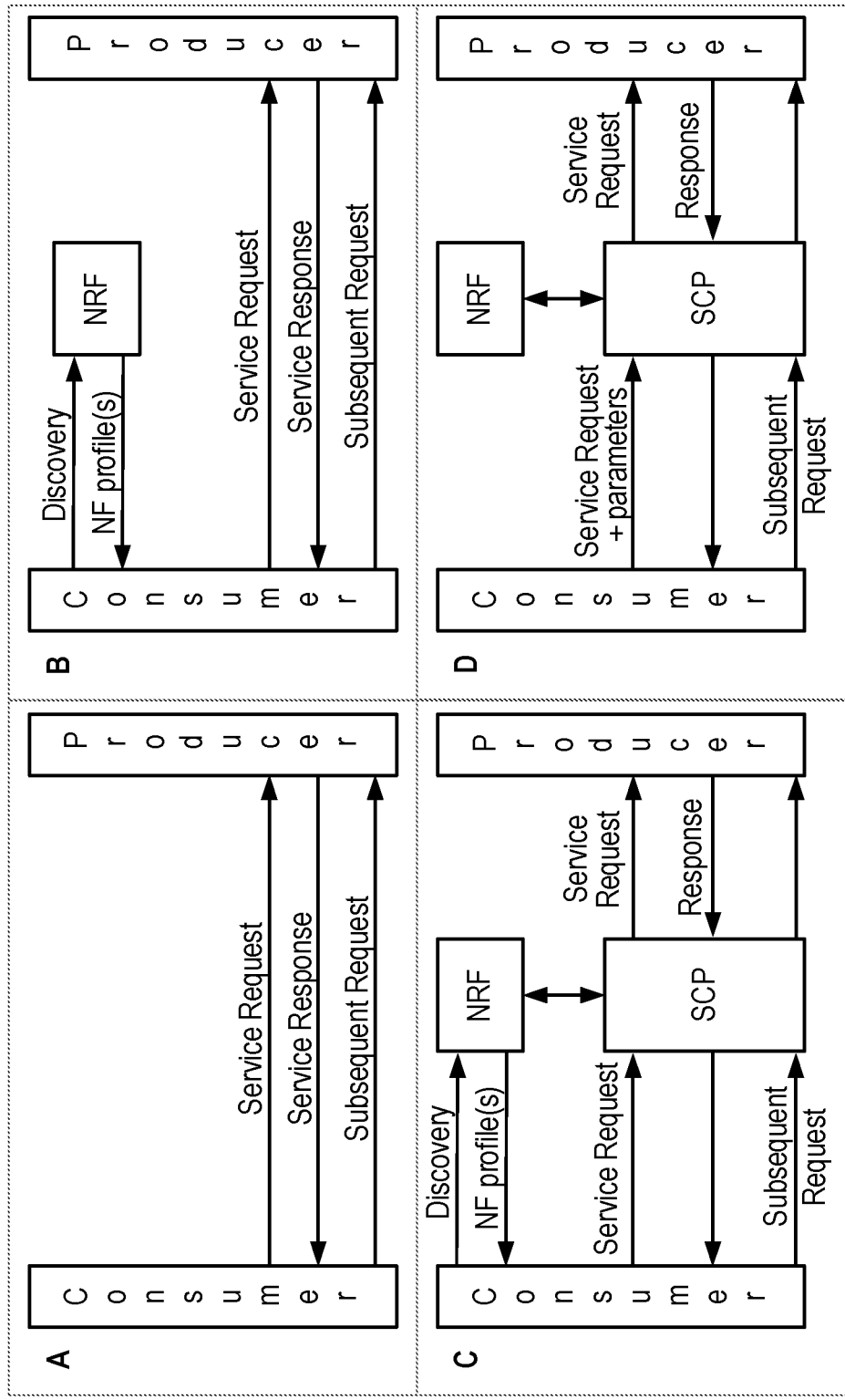
FIG. 1A-D is a block diagram illustrating different existing systems.
Figure 2A:
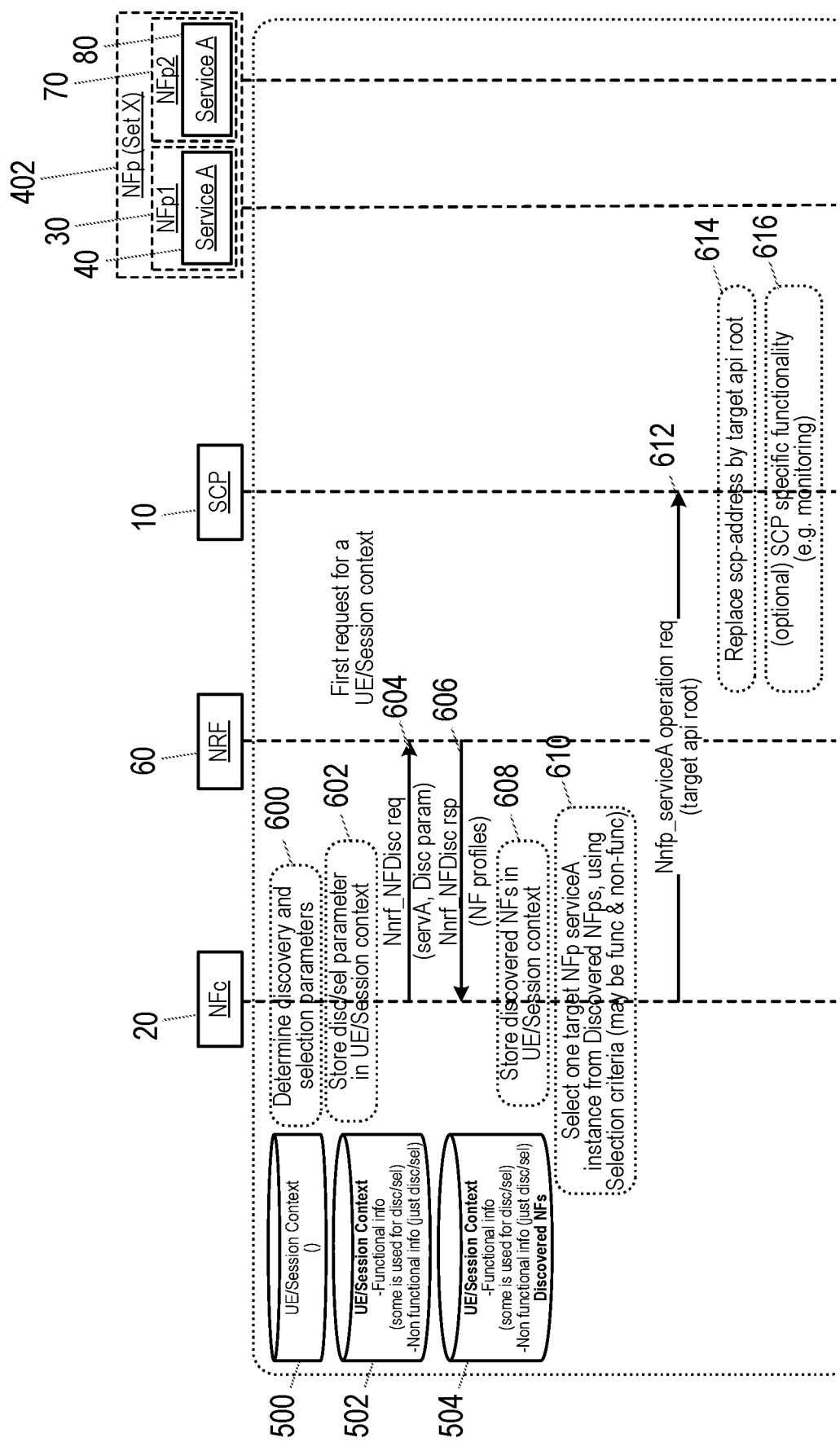
FIG. 2A-C is a signalling diagram illustrating an exchange of signals in an existing system.
Figure 2B:
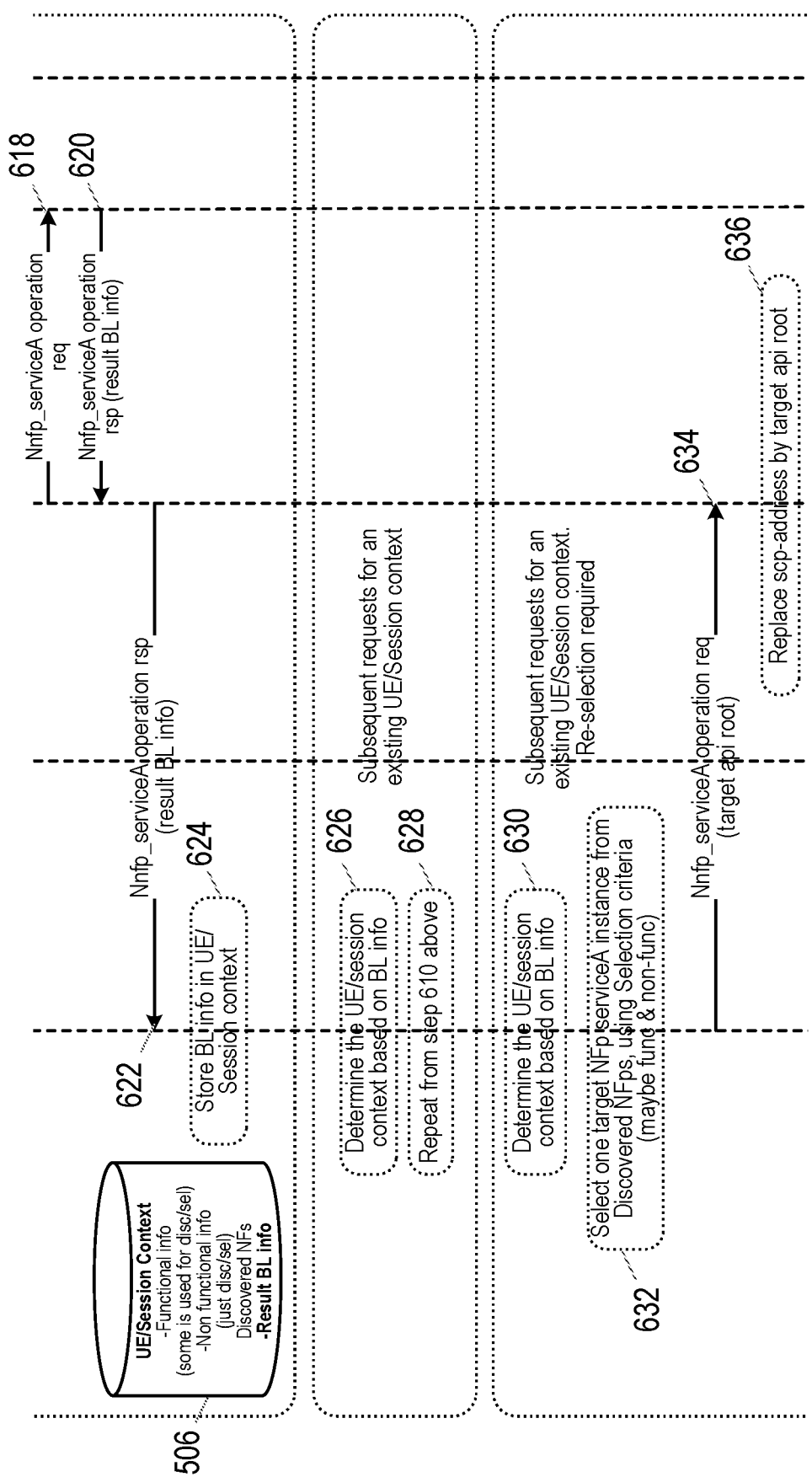
Figure 2C:
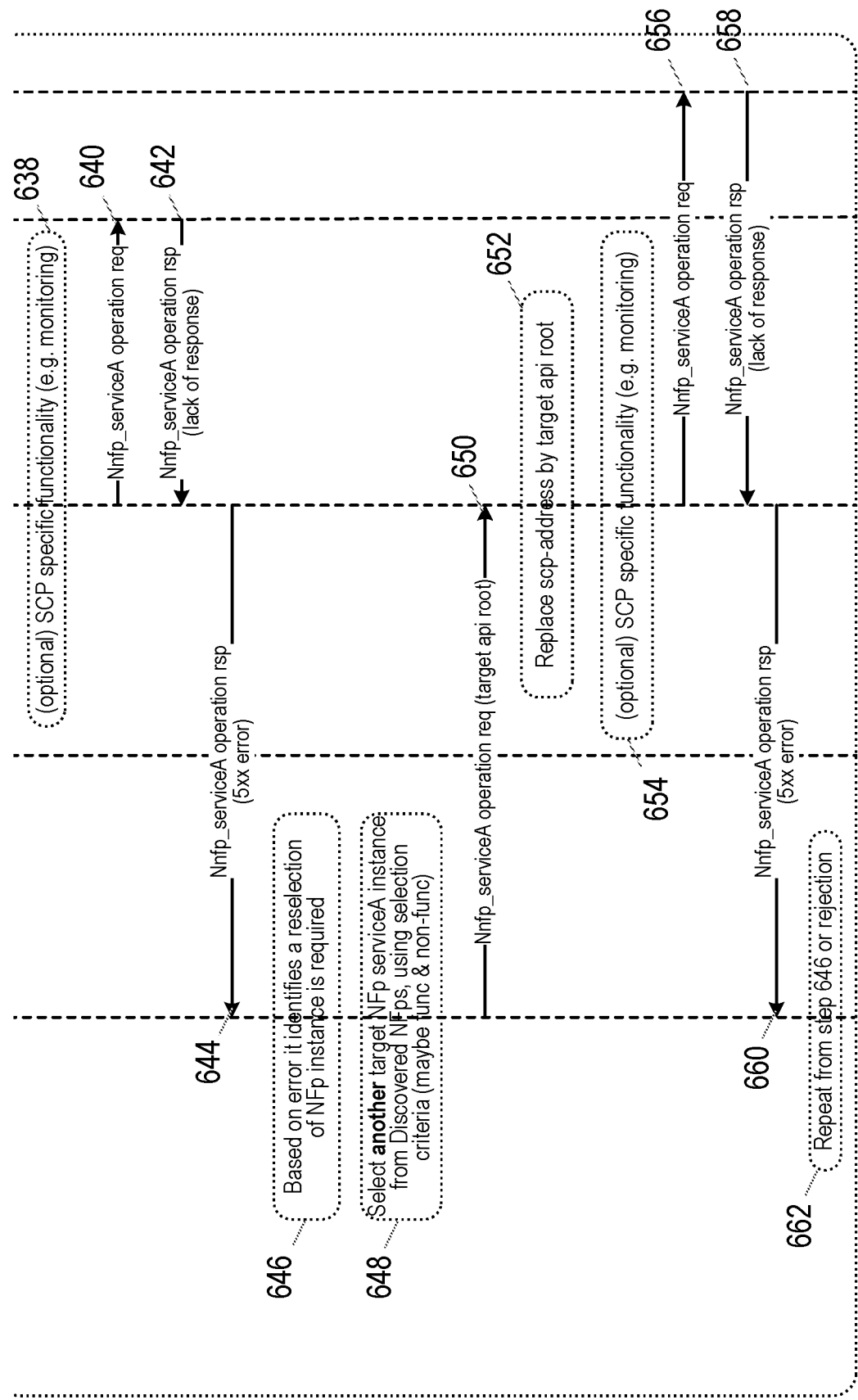

Steps 500-506 and 600-642 of FIG. 7A-C are as described earlier with reference to FIG. 2A-C. As illustrated by arrow 700 of FIG. 7A-C, if no response is received from the second NF node 30 to the first request 634, 640 transmitted towards the second NF node 30 via the first SCP node 10, the first SCP node 10 initiates transmission of information towards the first NF node 20. The information is indicative that no response is received from the second NF node 30 to the first request. That is, the information is indicative of a lack of response, which is a new error. In some embodiments, the information can be indicative of whether the second NF node 30 is operative and/or the information can be indicative of whether the first SCP node 10 failed to connect to the second NF node 30. In some embodiments, the information can be a newly created HTTP status code or the information may be accompanied by an existing HTTP status code.

The existing HTTP status codes may already be interpreted in a particular way, e.g. 500 is interpreted as an SCP error, which implies that the first NF node 20 will consider the first SCP node to have failed completely and the first NF node 20 will thus always use the second SCP node instead. However, this may not be required because connections from the first SCP node to other NF nodes of the service producer may be operative (e.g. up and running) and the error may not have been identified. As such, a new 5xx may be defined, or an existing 5xx may be complemented with the new information to indicate that there is a connectivity failure, but that the second NF node 30 is operative (e.g. up and running). An example of an existing 5xx that may be used is 504 Gateway Timeout.

As illustrated by block 702 of FIG. 7A-C, the first NF node 20 can identify based on the information that there may be a connectivity failure. Thus, the information can be interpreted unambiguously as a connectivity failure. The first NF node 20 can identify that problem is not the second NF node 30 and that an SCP re-selection may solve the issue.

In some embodiments, the first NF node 20 may check whether the second NF node 30 is operative. In some embodiments, checking whether the second NF node 30 is operative may comprise checking a status of the second NF node 30 to identify whether the second NF node 30 is operative. For example, the status may be checked with the second NF node 30 or the NRF 60. If the status is operative (e.g. up and running), then the first NF node 20 knows that the same second NF node 30 will be reachable if the first NF node 20 selects another SCP node. In the NRF, an "operative" status may be a "registered" status.

Although not illustrated in FIG. 7A-C, in some embodiments, checking the status with the second NF node 30 comprise initiating transmission of a third request towards the second NF node 30. The third request is a request for the status of the second NF node 30. In these embodiments, if a response to the third request is received from the second NF node 30, the second NF node 30 is operative. On the other hand, if no response to the third request is received from the second NF node 30, the second NF node 30 is inoperative. The third request may, for example, be a HTTP request, such as a HTTP ping request or a HTTP head request.

In some embodiments, the first NF node 20 may check whether the first SCP node 10 failed to connect to the second NF node 30. The first SCP node 10 failing to connect to the second NF node 30 may be the first SCP node 10 itself failing to connect to the second NF node 30 or at least one fourth SCP node failing to connect to the second NF node 30, where the at least one fourth SCP node is configured to operate as an SCP between the first SCP node 10 and the second NF node 30. In some embodiments, checking whether the at least one fourth SCP node failed to connect to the second NF node 30 may comprise checking a status of the at least one fourth SCP node to identify whether the at least one fourth SCP node failed to connect to the second NF node 30. For example, the status may be checked with the at least one fourth SCP node or the NRF 60.

Although not illustrated in FIG. 7A-C, in some embodiments, checking the status with the at least one fourth SCP node may comprise the first NF node 20 initiating transmission of a fourth request towards the at least one fourth SCP node. The fourth request is a request for the status of the at least one fourth SCP node. In these embodiments, if no response to the fourth request is received from at least one fourth SCP node, the at least one fourth SCP node failed to connect to the second NF node 30. On the other hand, if a response to the fourth request is received from the at least one fourth SCP node, the at least one fourth SCP node succeeded to connect to the second NF node 30. The fourth request may, for example, be a HTTP request, a HTTP ping request or a HTTP head request.

Returning back to FIG. 7A-C, as illustrated by block 704, the first NF node 20 selects an alternative SCP node. That is, the first NF node 20 is able to select an alternative SCP node instead of continually trying to reach another NF node of the service producer via the same first SCP node 10, which may cause a request failure or even multiple request failures, depending on the available NF nodes of the service producer. Having the ability to select an alternative SCP node prevents the first NF node 20 from continually selecting (in a loop) NF nodes of the service producer all with same wrong results and also prevents the first NF node 20 from having to abort the procedure. Thus, providing the first NF node 20 with the ability to select an alternative SCP node provides advantageous results in that service requests are more likely to be executed successfully.

For the purpose of this illustration, the first NF node 20 is assumed to select the second SCP node 50 as the alternative. As illustrated in FIG. 7A-C, the second SCP node 50 is an SCP node that is in the same SCP domain 400 as the first SCP node 10. This means that the second SCP node 50 is able to reach (or is capable of reaching) the same NF nodes (e.g. the second NF node 30) as the first SCP node 10. Generally, an SCP domain is a group of one or more SCPs that can reach certain NF nodes (or NF node instances) or SCPs directly, i.e. without passing through an intermediate SCP.

As illustrated by arrow 706 of FIG. 7A-C, the first NF node 20 initiates transmission of a second request towards the second NF node 30 via the second SCP node 50 for the second NF node 30 to execute (or provide) the service 40 for the first NF node 20. Thus, the first NF node 20 initiates transmission of the second request to the same NF node of the service producer but via an alternative SCP node. In some embodiments, transmission of the second request towards the second NF node 30 via the second SCP node 50 may (e.g. only) be initiated if the second NF node 30 is operative and/or if no response to the first request is received from the second NF node 30 due to the first SCP node 10 failing to connect to the second NF node 30.

In FIG. 7A-C, steps 708-712 are the same as steps 636-640 except that they are performed in relation to the second request. As illustrated by arrow 714 of FIG. 7A-C, in some embodiments, the second NF node 30 may initiate transmission of a response towards the second SCP node 50 indicative that the second request is executed successfully. The response may comprise some business logic (BL) information, e.g. as a result of the service execution. As illustrated by arrow 716 of FIG. 7A-C, in some embodiments, the second SCP node 50 may initiate transmission of the response indicative that the second request is executed successfully to the first NF node 20. As illustrated by blocks 508 and 718 of FIG. 7A-C, in some embodiments, the first NF node 20 may store the response.

Figure 8:
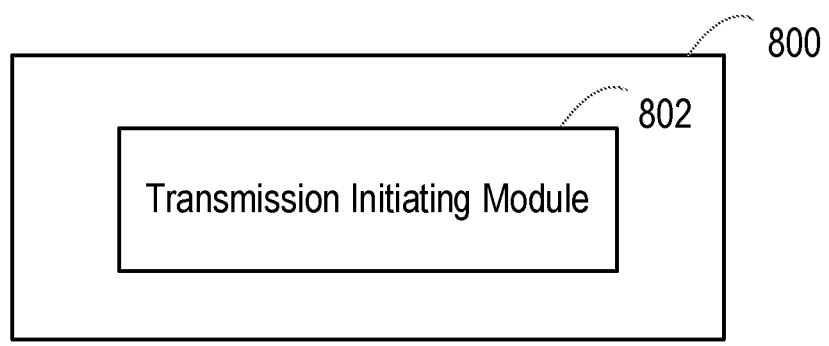
FIG. 8 is a block diagram illustrating a first SCP node according to an embodiment.

FIG. 8 is a block diagram illustrating a first SCP node 800 in accordance with an embodiment. The first SCP node 800 can handle a service request in a network. The first SCP node 800 can operate as an SCP between a first NF node of a service consumer and a second NF node of a service producer in the network. The first SCP node 800 comprises a transmission initiating module 802 configured to, if no response is received from the second NF node to a first request transmitted towards the second NF node via the first SCP node 800 (where the first request is for the second NF node to execute a service requested by the first NF node), initiate transmission of information towards the first NF node. The information is indicative that no response is received from the second NF node to the first request. The first SCP node 800 may operate in the manner described herein in respect of the first SCP node.

Figure 9:
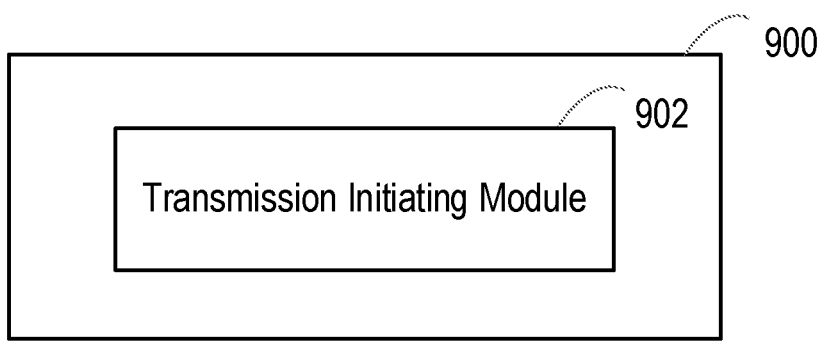
FIG. 9 is a block diagram illustrating a first NF node according to an embodiment.

FIG. 9 is a block diagram illustrating a first NF node 900 of a service consumer in accordance with an embodiment. The first NF node 900 can handle a service request in a network. A first NF node 900 can operate as an SCP between the first NF node and a second NF node of a service producer in the network. The first NF node 900 comprises a first transmission initiating module 902 configured to, in response to receiving information indicative that no response is received from the second NF node to a first request transmitted towards the second NF node via the first SCP node 800 (where the first request is for the second NF node to execute a service for the first NF node 900), initiate transmission of a second request towards the second NF node via a second SCP node for the second NF node to execute the service for the first NF node 900. The second SCP node is configured to operate as an SCP between the first NF node 900 and the second NF node in the network. The second SCP node is a different SCP node to the first SCP node 800. The first NF node 900 may operate in the manner described herein in respect of the first NF node.

There is also provided a computer program comprising instructions which, when executed by processing circuitry (such as the processing circuitry 12 of the first SCP node 10 described earlier and/or the processing circuitry 22 of the first NF node 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the first SCP node 10 described earlier and/or the processing circuitry 22 of the first NF node 20 described earlier) to cause the processing circuitry to perform at least part of the method described herein. There is provided a computer program product comprising a carrier containing instructions for causing processing circuitry (such as the processing circuitry 12 of the first SCP node 10 described earlier and/or the processing circuitry 22 of the first NF node 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

Other embodiments include those defined in the following numbered statements:

1. A method for handling a service request in a network, wherein the method is performed by a first service communication proxy, SCP, node (10) that is configured to operate as an SCP between a first network function, NF, node (20) of a service consumer and a second NF node (30) of a service producer in the network, the method comprising:
   if no response is received from the second NF node (30) to a first request (634, 640) transmitted towards the second NF node (30) via the first SCP node (10), wherein the first request is for the second NF node (30) to execute a service (40) requested by the first NF node (20):
     initiating (102, 700) transmission of information towards the first NF node (20), wherein the information is indicative that no response is received from the second NF node (30) to the first request (634, 640).

2. A method according to embodiment 1, wherein:
   the information is a newly created hypertext transfer protocol, HTTP, status code or the information is accompanied by an existing HTTP status code.

3. A method according to any of the preceding embodiments, wherein:
   the information is indicative of whether the second NF node (30) is operative.

4. A method according to any of the preceding embodiments, wherein:
   the information is indicative of whether the first SCP node (10) failed to connect to the second NF node (30).

5. A method according to any of the preceding embodiments, wherein:
   the first SCP node (10) and the first NF node (20) are deployed in independent deployment units; and/or
   the first SCP node (10) and the second NF node (30) are deployed in independent deployment units.
6. A method according to any of embodiments 1 to 4, wherein:
   the first SCP node (10) is deployed as a distributed network element.
7. A method according to embodiment 6, wherein:
   part of the first SCP node (10) is deployed in the same deployment unit as the first NF node (20); and/or
   part of the first SCP node (10) is deployed in the same deployment unit as the second NF node (30).
8. A method according to any of the preceding embodiments, wherein:
   at least one third SCP node is configured to operate as an SCP between the first NF node (20) and the first SCP node (10); and/or
   at least one fourth SCP node is configured to operate as an SCP between the first SCP node (10) and the second NF node (30).
9. A method according to embodiment 8, wherein:
   the first SCP node (10) and one or both of the at least one third SCP node and the at least one fourth SCP node are deployed in independent deployment units.
10. A method according to embodiment 8, wherein:
    the at least one third SCP node and/or the at least one fourth SCP node are deployed as distributed network elements.
11. A method according to any of the preceding embodiments, wherein:
    an entity comprises the first SCP node (10) and a network repository function, NRF (60).
12. A first SCP node (10) comprising:
    processing circuitry (12) configured to operate in accordance with any of embodiments 1 to 11.
13. A first SCP node (10) according to embodiment 12, wherein:
    the first SCP node (10) comprises:
      at least one memory (14) for storing instructions which, when executed by the processing circuitry (12), cause the first SCP node (10) to operate in accordance with any of embodiments 1 to 11.
14. A method for handling a service request in a network, wherein the method is performed by a first network function, NF, node (20) of a service consumer and wherein a first service communication proxy, SCP, node (10) is configured to operate as an SCP between the first NF node (20) and a second NF node (30) of a service producer in the network, the method comprising:
    in response to receiving (700) information indicative that no response is received from the second NF node (30) to a first request (634, 640) transmitted towards the second NF node (30) via the first SCP node (10), wherein the first request (640) is for the second NF node (30) to execute a service (40) for the first NF node (20):
      initiating (202, 706) transmission of a second request towards the second NF node (30) via a second SCP node (50) for the second NF node (30) to execute the service (40) for the first NF node (20), wherein the second SCP node (50) is configured to operate as an SCP between the first NF node (20) and the second NF node (30) in the network, and wherein the second SCP node (50) is a different SCP node to the first SCP node (10).
15. A method according to embodiment 14, the method comprising:
    selecting (704) the second SCP node (50).
16. A method according to embodiment 14 or 15, wherein:
    the second SCP node (50) is an SCP node that is in the same SCP domain as the first SCP node (10).
17. A method according to any of embodiments 14 to 16, wherein:
    the information is a newly created hypertext transfer protocol, HTTP, status code or the information is accompanied by an existing HTTP status code.
18. A method according to any of embodiments 14 to 17, wherein:
    transmission of the second request (706) towards the second NF node (30) via the second SCP node (50) is initiated if the second NF node (30) is operative.
19. A method according to any of embodiments 14 to 18, wherein:
    the information is indicative of whether the second NF node (30) is operative.
20. A method according to any of embodiments 14 to 19, the method comprising:
    checking (702) whether the second NF node (30) is operative.
21. A method according to embodiment 20, wherein:
    checking (702) whether the second NF node (30) is operative comprises:
      checking a status of the second NF node (30) to identify whether the second
    NF node (30) is operative.
22. A method according to embodiment 21, wherein:
    the status is checked with the second NF node (30) or a network repository function, NRF (60).
23. A method according to embodiment 22, wherein:
    checking the status with the second NF node (30) comprises:
      initiating transmission of a third request towards the second NF node (30),
      wherein the third request is a request for the status of the second NF node (30).
24. A method according to embodiment 23, wherein:
    if a response to the third request is received from the second NF node (30), the second NF node (30) is operative; or
    if no response to the third request is received from the second NF node (30), the second NF node (30) is inoperative.
25. A method according to embodiment 23 or 24, wherein:
    the third request is a hypertext transfer protocol, HTTP, request.
26. A method according to embodiment 25, wherein:
    the third request is a HTTP ping request or a HTTP head request.
27. A method according to any of embodiments 14 to 26, wherein:
    transmission of the second request (706) towards the second NF node (30) via the second SCP node (50) is initiated if no response to the first request (634, 640) is received from the second NF node (30) due to the first SCP node (10) failing to connect to the second NF node (30).
28. A method according to any of embodiments 14 to 27, wherein:

the information is indicative of whether the first SCP node (10) failed to connect to the second NF node (30).
29. A method according to any of embodiments 14 to 28, the method comprising:
checking whether the first SCP node (10) failed to connect to the second NF node (30).
30. A method according to any of embodiments 27 to 29, wherein:
the first SCP node (10) failing to connect to the second NF node (30) is:
the first SCP node (10) itself failing to connect to the second NF node (30); or
at least one fourth SCP node failing to connect to the second NF node (30), wherein the at least one fourth SCP node is configured to operate as an SCP between the first SCP node (10) and the second NF node (30).
31. A method according to embodiment 30, when dependent on embodiment 29, wherein:
checking (702) whether the at least one fourth SCP node failed to connect to the second NF node (30) comprises:
checking a status of the at least one fourth SCP node to identify whether the at least one fourth SCP node failed to connect to the second NF node (30).
32. A method according to embodiment 31, wherein:
the status is checked with the at least one fourth SCP node or a network repository function, NRF (60).
33. A method according to embodiment 32, wherein:
checking the status with the at least one fourth SCP node comprises:
initiating transmission of a fourth request towards the at least one fourth SCP node, wherein the fourth request is a request for the status of the at least one fourth SCP node.
34. A method according to embodiment 33, wherein:
if no response to the fourth request is received from at least one fourth SCP node, the at least one fourth SCP node failed to connect to the second NF node (30); or
if a response to the fourth request is received from the at least one fourth SCP node, the at least one fourth SCP node succeeded to connect to the second NF node (30).
35. A method according to embodiment 33 or 34, wherein:
the fourth request is a hypertext transfer protocol, HTTP, request.
36. A method according to embodiment 35, wherein:
the fourth request is a HTTP ping request or a HTTP head request.
37. A method according to any of embodiments 14 to 36, wherein:
the first SCP node (10) and the first NF node (20) are deployed in independent deployment units; and/or
the first SCP node (10) and the second NF node (30) are deployed in independent deployment units.
38. A method according to any of embodiments 14 to 36, wherein:
the first SCP node (10) is deployed as a distributed network element.
39. A method according to embodiment 38, wherein:
part of the first SCP node (10) is deployed in the same deployment unit as the first NF node (20); and/or
part of the first SCP node (10) is deployed in the same deployment unit as the second NF node (30).

40. A method according to any of embodiments 14 to 39, wherein:
at least one third SCP node is configured to operate as an SCP between the first NF node (20) and the first SCP node (10), wherein the at least one third SCP node is a different SCP node to the second SCP node (50); and/or
at least one fourth SCP node is configured to operate as an SCP between the first SCP node (10) and the second NF node (30), wherein the at least one fourth SCP node is a different SCP node to the second SCP node (50).
41. A method according to embodiment 40, wherein:
the first SCP node (10) and one or both of the at least one third SCP node and the at least one fourth SCP node are deployed in independent deployment units.
42. A method according to embodiment 40, wherein:
the at least one third SCP node and/or the at least one fourth SCP node are deployed as distributed network elements.
43. A method according to any of embodiments 14 to 42, wherein:
an entity comprises the first SCP node (10) and a network repository function, NRF (60).
44. A first NF node (20) comprising:
processing circuitry (22) configured to operate in accordance with any of according to any of the preceding embodiments 14 to 43.
45. A first NF node (20) according to embodiment 44, wherein:
the first NF node (20) comprises:
at least one memory (24) for storing instructions which, when executed by the processing circuitry (22), cause the first NF node (20) to operate in accordance with any of embodiments 14 to 43.
46. A method performed by a system, the method comprising:
the method according to any of embodiments 1 to 11; and/or
the method according to any of embodiments 14 to 43.
47. A system comprising:
at least one first SCP node (10) according to embodiment 12 or 13; and/or
at least one first NF node (20) according to embodiment 44 or 45.
48. A computer program comprising instructions which, when executed by processing circuitry, cause the processing circuitry to perform the method according to any of embodiments 1 to 11 and/or any of embodiments 14 to 43.
49. A computer program product, embodied on a non-transitory machine-readable medium, comprising instructions which are executable by processing circuitry to cause the processing circuitry to perform the method according to any of embodiments 1 to 11 and/or any of embodiments 14 to 43.

In some embodiments, the first SCP node functionality and/or the first NF node functionality described herein can be performed by hardware. Thus, in some embodiments, any one or more of the first SCP node 10 and the first NF node 20 described herein can be a hardware node. However, it will also be understood that optionally at least part or all of the first SCP node functionality and/or the first NF node functionality described herein can be virtualized. For example, the functions performed by any one or more of the first SCP node 10 and the first NF node 20 described herein can be implemented in software running on generic hardware that is configured to orchestrate the node functionality. Thus, in some embodiments, any one or more of the first SCP node 10 and the first NF node 20 described herein can be a virtual node. In some embodiments, at least part or all of the first SCP node functionality and/or the first NF node functionality described herein may be performed in a network enabled cloud. The first SCP node functionality and/or the first NF node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there is advantageously provided an improved technique for handling service requests in a network. The first NF node 20 can be provided with the right information to allow a re-selection of an alternative SCP to route via the same NF of a service producer, e.g. when the failure seems to be due to a connectivity issue from the SCP to the NF of the service producer, rather than to a failure of an NF service producer.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for handling a service request in a network, wherein the method is performed by a first service communication proxy, SCP, node that is configured to operate as an SCP between a first network function, NF, node of a service consumer and a second NF node of a service producer in the network, the method comprising:
   initiating transmission of information towards the first NF node if no response is received from the second NF node to a first request transmitted towards the second NF node via the first SCP node,
   wherein the first request is for the second NF node to execute a service requested by the first NF node and the information is indicative that no response is received from the second NF node to the first request.

2. The method as claimed in claim 1, wherein:
   the information is a newly created hypertext transfer protocol, HTTP, status code or the information is accompanied by an existing HTTP status code.

3. The method as claimed in claim 1, wherein:
   the information is indicative of whether the second NF node is operative.

4. The method as claimed in claim 1, wherein:
   the information is indicative of whether the first SCP node failed to connect to the second NF node.

5. A method for handling a service request in a network, wherein the method is performed by a first network function, NF, node of a service consumer and wherein a first service communication proxy, SCP, node is configured to operate as an SCP between the first NF node and a second NF node of a service producer in the network, the method comprising:
   initiating transmission of a second request towards the second NF node via a second SCP node in response to receiving information indicative that no response is received from the second NF node to a first request transmitted towards the second NF node via the first SCP node,
   wherein the first request is for the second NF node to execute a service for the first NF node and the second request is for the second NF node to execute the service for the first NF node,
   wherein the second SCP node is configured to operate as an SCP between the first NF node and the second NF node in the network, and wherein the second SCP node is a different SCP node to the first SCP node.

6. The method as claimed in claim 5, the method comprising:
   selecting the second SCP node.

7. The method as claimed in claim 5, wherein:
   the second SCP node is an SCP node that is in the same SCP domain as the first SCP node.

8. The method as claimed in claim 5, wherein:
   the information is a newly created hypertext transfer protocol, HTTP, status code or the information is accompanied by an existing HTTP status code.

9. The method as claimed in claim 5, wherein:
   transmission of the second request towards the second NF node via the second SCP node is initiated if the second NF node is operative.

10. The method as claimed in claim 5, wherein:
    the information is indicative of whether the second NF node is operative.

11. The method as claimed in claim 5, the method comprising:
    checking whether the second NF node is operative.

12. The method as claimed in claim 11, wherein:
    checking whether the second NF node is operative comprises:
    checking a status of the second NF node to identify whether the second NF node is operative.

13. The method as claimed in claim 12, wherein:
    the status is checked with the second NF node or a network repository function, NRF.

14. The method as claimed in claim 13, wherein:
    checking the status with the second NF node comprises:
    initiating transmission of a third request towards the second NF node, wherein the third request is a request for the status of the second NF node.

15. The method as claimed in claim 14, wherein:
    if a response to the third request is received from the second NF node, the second NF node is operative; or
    if no response to the third request is received from the second NF node, the second NF node is inoperative.

16. The method as claimed in claim 14, wherein:
    the third request is a hypertext transfer protocol, HTTP, request.

17. The method as claimed in claim 16, wherein:
    the third request is a HTTP ping request or a HTTP head request.

18. The method as claimed in claim 5, wherein:
    transmission of the second request towards the second NF node via the second SCP node is initiated if no response to the first request is received from the second NF node due to the first SCP node failing to connect to the second NF node.

19. The method as claimed in claim 18, wherein:
    the first SCP node failing to connect to the second NF node is:
    the first SCP node itself failing to connect to the second NF node; or at least one fourth SCP node failing to connect to the second NF node, wherein the at least one fourth SCP node is configured to operate as an SCP between the first SCP node and the second NF node.

20. The method as claimed in claim 19, further comprising checking whether the first SCP node failed to connect to the second NF node, and wherein:
checking whether the at least one fourth SCP node failed to connect to the second NF node comprises:
checking a status of the at least one fourth SCP node to identify whether the at least one fourth SCP node failed to connect to the second NF node.

21. The method as claimed in claim 20, wherein:
the status is checked with the at least one fourth SCP node or a network repository function, NRF.

22. The method as claimed in claim 21, wherein:
checking the status with the at least one fourth SCP node comprises:
initiating transmission of a fourth request towards the at least one fourth SCP node, wherein the fourth request is a request for the status of the at least one fourth SCP node.

23. The method as claimed in claim 22, wherein:
if no response to the fourth request is received from at least one fourth SCP node, the at least one fourth SCP node failed to connect to the second NF node; or
if a response to the fourth request is received from the at least one fourth SCP node, the at least one fourth SCP node succeeded to connect to the second NF node.

24. The method as claimed in claim 22, wherein:
the fourth request is a hypertext transfer protocol, HTTP, request.

25. The method as claimed in claim 24, wherein:
the fourth request is a HTTP ping request or a HTTP head request.

26. The method as claimed in claim 5, wherein:
the information is indicative of whether the first SCP node failed to connect to the second NF node.

27. The method as claimed in claim 5, the method comprising:
checking whether the first SCP node failed to connect to the second NF node.

* * * * *